United States Patent

Pieters

[15] 3,683,108

[45] Aug. 8, 1972

[54] TELEVISION CAMERA TUBE RESIDUAL CHARGE REMOVAL

[72] Inventor: Leon Andre Pieters, 71 Beaumont Rd., Cambridge, England

[22] Filed: Oct. 30, 1970

[21] Appl. No.: 85,385

[30] Foreign Application Priority Data

Oct. 31, 1969 Great Britain..........53,402/69

[52] U.S. Cl...................................................178/7.2
[51] Int. Cl...............................................H04n 5/34
[58] Field of Search...........178/7.1, 7.2, 7.7, DIG. 28

[56] References Cited

UNITED STATES PATENTS

| | | | |
|---|---|---|---|
| 3,577,153 | 5/1971 | Yagi et al. | 178/7.2 |
| 3,431,460 | 3/1969 | Webb | 178/7.2 X |
| 3,414,668 | 12/1968 | Adams et al. | 178/7.7 |
| 3,499,109 | 3/1970 | Kihava et al. | 178/7.2 |

*Primary Examiner*—Robert L. Richardson
*Attorney*—Beveridge and De Grandi

[57] ABSTRACT

This invention concerns the reduction in the time taken to erase the residual charge pattern from a television camera tube target. The invention is applicable to television camera tubes having a photosensitive layer of fast internal time constant which is defined in the specification. The invention is performed by increasing the scanning rate of the electron beam during the erase scan. In this way more than one erase scan can be performed in the time normally occupied by a single frame scan of the camera target. Either frame scanning rate or line scanning rate or both can be increased. If the line scanning rate is increased it is also found necessary to increase the beam current and in some circumstances increased spot size during erase intervals has also been found to be advantageous. The invention also provides for gating the video output from the camera tube during each erase interval.

13 Claims, 3 Drawing Figures

Figure 1:
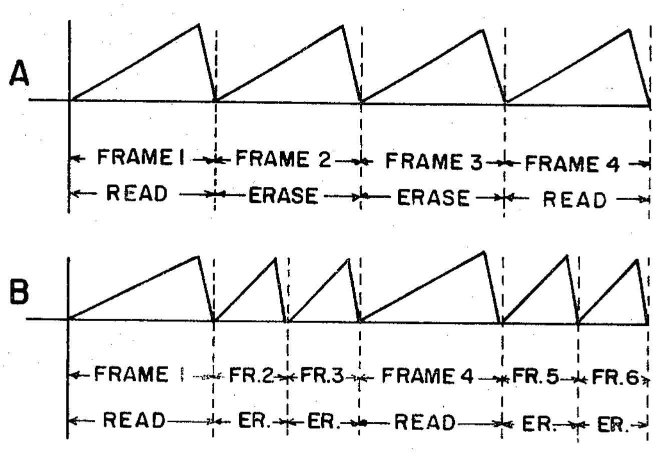

INVENTOR
LEON ANDRE PIETERS
BY Beveridge and De Grandi
ATTORNEYS

TELEVISION CAMERA TUBE RESIDUAL CHARGE REMOVAL

This invention concerns television picture production and in particular a method and device for rapidly erasing the electrical charge pattern in a television camera tube having a photosensitive layer of fast internal time constant, while running at speeds similar to those used in conventional television scanning. Such a tube is the Plumbicon (registered Trade Mark) tube.

A photosensitive layer having a fast internal time constant is one in which a large proportion of internally stored residual charge leaks through to the surface of the photo-conductive layer in the time corresponding to one frame scan period of the scanning rate normally employed.

The invention has particular application in an image analysis system designed to look at and analyze a large number of specimens in rapid succession. In such a system the photo-conductive target of a television camera tube is first charged uniformly by scanning with an electron beam. An image of a specimen to be analyzed is then flashed onto the target. This results in a change in the charge over the surface of the target and a charge pattern results which is directly proportional to the illumination of the image flashed thereon. The target is subsequently scanned by the electron beam and a modulation of the beam current results in accordance with the charge pattern arising from the image. This subsequent scan is referred to as a read-out scan.

All the information required for analysis can be obtained from one read-out scan and since this usually corresponds to one complete frame scan by the electron beam, in theory a different specimen could be scanned during each successive frame scan.

However in practice, the target does not assume a uniform charge pattern as the result of a single frame scan due to the inherent time constant of the target material. A small residual charge pattern is found to remain and this will be picked up during a subsequent read-out scan.

The read-out rate of such a system (i.e. number of specimens that can be analyzed per unit time) is thus reduced, since it is necessary to perform a number of complete frame scans of the target between each read-out scan, to clean the target, i.e. to remove the residual charge pattern from a previous image and produce an acceptably uniform charge pattern over the target, ready for the next image.

It is an object of the present invention to reduce the time required to clean the target between read-out scans.

According to the present invention a method of rapidly erasing the electrical charge pattern at the end of a read-out scan in a television tube having a fast internal time constant photosensitive layer comprises, altering the scanning rate of the camera beam to increase the number of frame scans performed per unit time for the duration of the erase interval.

Typically the frame scan rate is doubled during the erase interval whereby two complete frame scans are made in the time normally required for one read-out scan.

It has been found desirable to simultaneously increase spot size during the erase interval since for example, the number of horizontal lines in the raster are halved if the frame scanning rate is doubled. Thus in this example, the spot size must be doubled at least in the frame direction, to ensure that horizontal bands of residual charge are not left in the target layer.

The spot size may be varied during the erase interval by altering the focusing of the electron beam.

Erasure is improved by increasing the number of erase scans during the erase interval. This can either be done by increasing the erase interval, which is not desirable, or further multiplying the frame scanning rate during erasure. This of course results in a further decrease in the number of lines per erase frame scan. Although this can be compensated for by increasing the spot size, in practice this is only useful for filling in the gaps when these are small and after the ratio of gaps to lines exceeds for example 3:1, it becomes difficult to produce a uniform charge pattern.

A further improvement can however be made by simultaneously increasing the line scanning rate and the beam current during the erase intervals. This allows a further increase in the frame scanning rate without the necessity to further increase the spot size, thus allowing still more erase scans to be made during a given erase interval or the erase interval to be further decreased while still providing a given number of erase scans. It will be appreciated that where the same multiplying factor is applied to both line and frame scan rates, it is not necessary to increase the spot size, but only the beam current to compensate for the increased line scan rate.

Preferably the video output from the camera is blocked during each erase interval.

The invention also provides apparatus for performing the method of fast erasure provided by the invention, comprising a master timing generator for controlling and synchronizing both line and frame scan generators for the camera tube and a read-erase control unit arranged to generate switching signals for controlling the frame scan generator and tube operating supplies, to increase the frame scanning rate and increase spot size during erase intervals. The read-erase unit may in addition provide signals for controlling the line scan generator.

According to a preferred feature of the invention electrical or electronic gate means is provided in the electrical video signal output path from the camera tube and controlled by signals from the read-erase control unit to block the passage of video from the camera tube during erase intervals.

Figure 2:
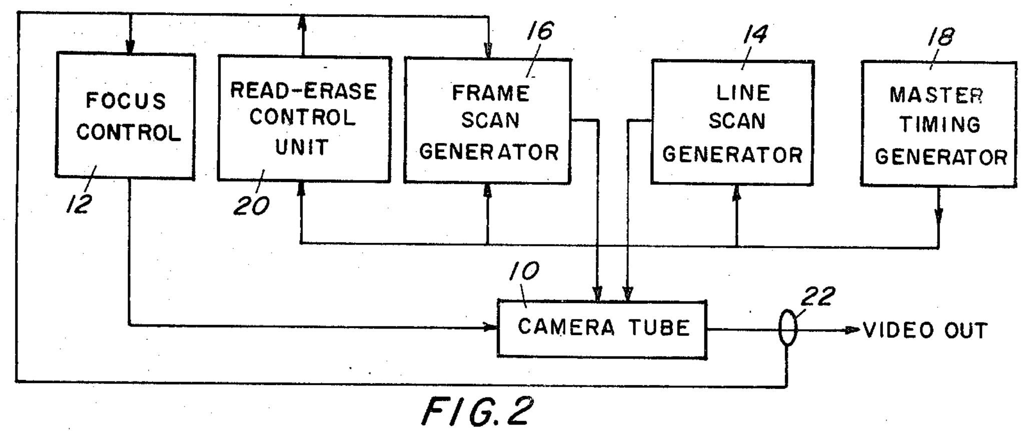
Figure 3:
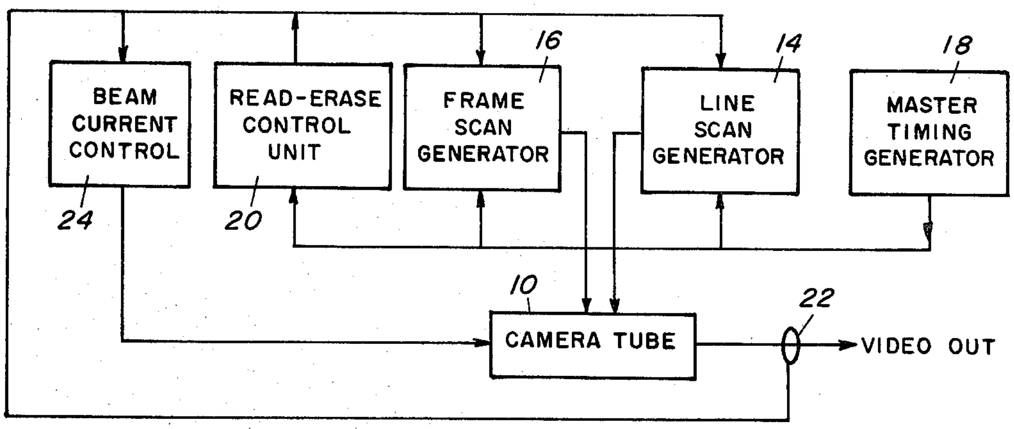

The invention will now be described by way of example with reference to the accompanying drawings, in which FIG. 1 is a graphical illustration on a time axis the scanning waveform obtained from an unmodified system and that obtained from a system constructed as an embodiment of the present invention, in which the frame scanning rate is doubled during the erase interval, FIG. 2 is a block circuit diagram illustrating one embodiment of the invention, and FIG. 3 is a block circuit diagram illustrating a second embodiment of the invention.

FIG. 1A illustrates graphically on a time axis a typical frame scanning waveform of an unmodified system in which two complete frame scans are employed to erase residual charge from the camera target between each read-scan. Accordingly a time period equivalent to two complete frame scans is wasted between each useful frame scan and the equipment can be said to be only 33⅓ percent efficient.

FIG. 1B illustrates a frame scanning waveform as applied to a camera tube in a system constructed as an embodiment of the present invention, in which the frame scanning rate is doubled during each erase interval so that two complete erase scans can be obtained in approximately the time normally occupied by one frame scan. As a result, the time interval between useful frame scans is reduced approximately to one frame scan period and the equipment can be said to be 50 percent efficient.

FIG. 2 illustrates in block circuit diagram form, one embodiment of the invention in which the frame scanning rate and tube operating supplies are altered during each erase interval. The system comprises a camera tube 10 having tube focus control 12 and a line scan generator 14 and frame scan generator 16. Overall control of the system is obtained by a master timing generator 18 which supplies timing pulses to the line and frame scan generators 14 and 16 and to a read-erase control unit 20 the output of which is applied to the frame scan generator 16 and tube focus control 12. The read-erase control unit 20 which is arranged to supply control pulses to the frame scan generator 16 and tube focus control 12 at the beginning and ending of each erase interval, is thus synchronized with the remainder of the system. The control pulses are arranged to adjust the operating condition of the frame scan generator to produce a multiple of the normal frame scan frequency and to produce an increased spot size by defocusing the beam to the required extent.

The control signals from the read-erase control unit 20 are also supplied to a gate 22 in the video output signal path from the camera tube 10. The control signals are arranged to close the gate 22 during the erase interval to prevent any unwanted signal from passing from the camera. It will be appreciated that where the camera output is otherwise gated by the video amplifier or like equipment to which the signal is supplied, the gate 22 may not always be necessary.

FIG. 3 illustrates a second embodiment of the invention which in some respects is similar to the circuit shown in FIG. 2. Accordingly the same reference numerals have been employed for items common to FIGS. 1 and 2. In this second embodiment, control signals are supplied from the control unit 20 to the line scan generator 14 and the frame scan generator 16, to increase both line and frame scan raster by the same multiplying factor and simultaneously to a beam current control unit 24, to increase the latter during each erase interval. It has been found necessary to increase beam current to compensate for the increased spot velocity when line frequency is increased.

It will be appreciated that by increasing both line and frame scan rates by the same multiplying factor, each scan will contain the same number of lines, whether during read or erase, so that no increase in spot size is required.

Although only preferred embodiments of the system for improving the erasure of television camera tubes have been specifically illustrated and described, it is to be understood that minor variations may be made therein without departing from the spirit of the invention.

I claim:

1. In a method of image analysis employing a television camera tube having a target with a fast internal time constant photosensitive layer, wherein an image to be scanned is flashed on to the photosensitive layer to form a charge pattern thereon corresponding to the image, the charge pattern is read during one read-out scan of a scanning electron beam and any residual charge pattern in the photosensitive layer corresponding to a preceeding image is removed by a plurality of erase scans by the electron beam prior to the next read scan, the improvement comprising, increasing the rate of scanning of said electron beam performed per unit time for the duration of the erase interval.

2. The method as set forth in claim 1 further comprising the step of blocking the video signal output from the camera tube during the erase interval.

3. The method as set forth in claim 2 wherein said step of increasing the rate of scanning comprises increasing the frame scan rate and wherein the spot size on the target is increased simultaneously with increasing said frame scan rate during the erase interval.

4. The method as set forth in claim 3 wherein the spot size is increased by altering the focusing of the electron beam.

5. The method as set forth in claim 1 wherein said step of increasing the rate of scanning comprises increasing the number of frame scans performed per unit time and wherein the number of line scans performed per unit time and the current of said electron beam are simultaneously increased with increasing the number of frame scans performed per unit of time during the erase interval.

6. The method as set forth in claim 5 further comprising the step of blocking the video signal output from the camera tube during the erase interval.

7. The method as set forth in claim 5 comprising the step of increasing the spot size during the erase interval.

8. Apparatus for producing a video signal for an image analysis system corresponding to an image which is flashed onto the photosensitive layer of a television camera tube and which is converted into a video signal during a read scan and in which the residual charge pattern is reduced to an acceptable layer during subsequent erase scans, comprising in combination:

a television camera tube having a fast internal time constant photosensitive layer, means for generating line scan pulses, means for generating frame scan pulses, a read-erase control unit arranged to generate switching signals for controlling the frame scan generator to increase the frequency of the frame scan pulses during the erase intervals to be greater than the frequency of the frame scan pulses during the read interval, and a master timing generator for controlling and synchronizing the line scan pulse generator, the frame scan pulse generator and the read-erase control unit.

9. Apparatus as set forth in claim 8 comprising in combination therewith electrical or electronic gate means controlling the video signal output of the camera tube and responsive to signals from the read-erase control unit to block the passage of video signal from the camera tube during the erase interval.

10. Apparatus as set forth in claim 9 further comprising in combination therewith means to defocus the beam in the camera tube to thereby increase spot size during the erase interval.

11. Apparatus as set forth in claim 9 further comprising in combination therewith means to increase the frequency of the line scan pulses produced by the line scan generator and means to increase the beam current of the camera tube, each said means being responsive to signals from the read-erase control unit.

12. Apparatus as set forth in claim 11 further comprising in combination therewith means for controlling the focusing of the camera beam to defocus the beam and thereby increase spot size during the erase interval.

13. In a method of image analysis employing a television camera tube having a target with a fast internal time constant photosensitive layer wherein an image to be scanned is flashed on to the photosensitive layer to form a charge pattern thereon corresponding to the image, the charge pattern is read during one read-out scan of a scanning electron beam occurring during a read-out interval and any residual charge pattern in the photosensitive layer corresponding to a preceding image is removed by a plurality of erase scans by the electron beam prior to the next read scan, said erase scans occurring during an erase interval, the improvement comprising:

increasing the rate of scanning of said electron beam performed per unit time during said erase interval so that it is greater than the rate of scanning during said read interval and correspondingly decreasing the duration of said erase interval.

* * * * *

UNITED STATES PATENT OFFICE
CERTIFICATE OF CORRECTION

Patent No. 3,683,108 Dated August 8, 1972

Inventor(s) Leon Andre Pieters

It is certified that error appears in the above-identified patent and that said Letters Patent are hereby corrected as shown below:

In the heading, omitted item [73] should be

[73] Assignee: Image Analysing Computers
Limited Melbourn, Royston,
Hertfordshire, England Signed and sealed this 10th day of April 1973.

(SEAL)
Attest:

EDWARD M.FLETCHER,JR.
Attesting Officer

ROBERT GOTTSCHALK
Commissioner of Patents